(12) United States Patent
Michalski

(10) Patent No.: US 8,049,371 B2
(45) Date of Patent: Nov. 1, 2011

(54) DEVICE FOR OPTIMISING THE ENERGY CONSUMPTION OF AN ELECTRIC CIRCUIT COMPONENT

(75) Inventor: Bernhard Michalski, Maulburg (DE)

(73) Assignee: Endress + Hauser GmbH + Co. KG, Hauptstr. 1, Maulburg (DE)

( * ) Notice: Subject to any disclaimer, the term of this patent is extended or adjusted under 35 U.S.C. 154(b) by 555 days.

(21) Appl. No.: 11/990,516

(22) PCT Filed: Jul. 13, 2006

(86) PCT No.: PCT/EP2006/064219
§ 371 (c)(1),
(2), (4) Date: Feb. 25, 2009

(87) PCT Pub. No.: WO2007/020141
PCT Pub. Date: Feb. 22, 2007

(65) Prior Publication Data
US 2009/0219084 A1 Sep. 3, 2009

(30) Foreign Application Priority Data

Aug. 18, 2005 (DE) .................. 10 2005 039 438

(51) Int. Cl.
*B23K 11/24* (2006.01)
*H02B 1/24* (2006.01)

(52) U.S. Cl. ........................................ 307/112
(58) Field of Classification Search ............... 307/112, 307/140; 340/310.11, 310.12
See application file for complete search history.

(56) References Cited

U.S. PATENT DOCUMENTS

| 4,926,158 A | 5/1990 | Zeigler |
| 5,089,974 A | 2/1992 | Demeyer |
| 6,014,100 A | 1/2000 | Fehrenbach |

FOREIGN PATENT DOCUMENTS

| DE | 39 07 652 A1 | 9/1990 |
| DE | 102 96 400 B4 | 4/2004 |
| EP | 0 794 480 A1 | 9/1997 |
| EP | 1 174 841 A1 | 1/2002 |

*Primary Examiner* — Jared Fureman
*Assistant Examiner* — Carlos Amaya
(74) *Attorney, Agent, or Firm* — Bacon & Thomas, PLLC

(57) ABSTRACT

An apparatus for optimizing power consumption of an electrical circuit component in an operating- and evaluating-circuit of a two-conductor field device, wherein a control unit is provided, which switches the electrical circuit component with a clock signal. An energy supply unit is provided for supplying the circuit component with energy, and wherein at least one energy-storing component is connected to at least one output, at least one input and/or a supply input of the electrical circuit component. The apparatus provides for a field device, a suitable electronics for enabling improvement of the energy budget of the evaluating- and operating-circuit, especially its circuit component.

10 Claims, 2 Drawing Sheets

DEVICE FOR OPTIMISING THE ENERGY CONSUMPTION OF AN ELECTRIC CIRCUIT COMPONENT

TECHNICAL FIELD

The present invention relates to an apparatus for optimizing power consumption of an electrical circuit component in an operating- and evaluating-circuit of a two-conductor field device, wherein a control (either open-loop or closed-loop) unit is provided, which switches the electrical circuit component on with a clock signal, wherein an energy supply unit for supplying of the circuit component with energy is provided, and wherein at least one output, at least one input and/or a supply input of the electrical circuit component is connected to at least one energy-storing component.

BACKGROUND DISCUSSION

The progress of microelectronics in the last years has led to a miniaturization of field devices and an integration of functionalities, which has brought-about in automation technology an effective and cost-favorable application of energy-saving, integrated, decentralized systems. Thus, not only the measured values are ascertained in the sensors and actuators, but, also, the measured values are already preprocessed and linearized. Furthermore, a self-diagnosis of the sensor or actuator is implemented. Prerequisite for the introduction of these decentralized functionalities in a closed automation concept with "intelligent" sensors and actuators is an increased information- and data-exchange of these decentralized units among one another and with a control system. In automation technology, for this reason, in the last years, a large number of fieldbus systems have come into being, which relate either to company-specific areas of application (e.g. BITBUS, CAN, MODBUS RACKBUS) or are based on an international standard (e.g. HART, PROFIBUS-PA, Foundation FIELDBUS, Ethernet). The large number of fieldbus systems, which are currently used in industrial automation technology and process control technology, is referred to in the following with the generic terms "fieldbusses" or "fieldbus systems".

Conventional field devices are grid-fed, four-conductor, field devices and include at least two electrical supply lines, or conductors, for energy supply of the field device. Furthermore, two further signal lines are needed as fieldbus, which transmit the measured-value-mapping, measurement signal or other communication data signals between the decentralized units and a control station. In general, the measurement signal or communication data signal is produced and transmitted according to a standard usual therefore, e.g. according to the 4-20 mA current-loop standard, a usual frequency-standard or a digital standard.

Moreover, it is also usual in automation technology, to construct the fieldbus of the field devices in a so-called two-conductor technology and to connect them with one another, so that their communication and energy supply is accomplished via the fieldbus exclusively and simultaneously via a two-wire line, whereby the wiring effort and, thus, the wiring costs of networked, decentralized, automation systems can be lessened.

Examples of such two-conductor field devices, especially two-conductor measuring devices or two-conductor actuating devices, are disclosed in, among others, U.S. Pat. No. 6,014,100.

For historically related reasons and for reasons of intrinsic explosion protection, such two-conductor field devices are predominantly so designed, that a supply current instantaneously flowing in the single line-pair, embodied as an electrical current loop, at an electrical current level value lying between 4 mA and 20 mA, simultaneously also represents the measured value instantaneously produced by the field device or the actuating value instantaneously sent to the field device. In the case of two-conductor field devices, the available input power is significantly limited to, for example, 48 mW. The electronics in the field device must be so designed, that it still works reliably also in the case of a minimum signal current of 4 mA. As a result of this, a problem in the case of such two-conductor field devices is, that the electrical power convertible by the field-device electronics—such being also referred to as "available power"—can strongly fluctuate in a, for practical purposes, unpredictable manner during operation of the two-conductor field device. Taking this situation into consideration, modern two-conductor field devices with a 4-20 mA electrical current loop are, therefore, usually so designed, that their device-functionality implemented by means of a microcomputer provided in the evaluating- and operating-circuit is changeable, and, thus, the power converted in the operating- and evaluating-circuit can be matched to the instantaneously available power.

A suitable matching of the field device electronics to the available power can be achieved, e.g. such as also proposed in U.S. Pat. No. 6,014,100, EP-A 1 174 841 or U.S. Pat. No. 5,416,723, by balancing the power instantaneously converted in the field device with the instantaneously available power, and, indeed, in such a manner, that particular, functional units or circuit components of the operating- and evaluating-circuit of the field device are operated with appropriately variable clock rates, coupled with being, at times, turned off or placed in a sleep mode.

A disadvantage of such a clocked circuit component in the operating- and evaluating-circuit of a two-conductor device is to be seen in the fact that, energy-storing components connected to the outputs or inputs of the circuit component are completely discharged and charged in each clock cycle, since the energy-storing component is discharged via a parasitic discharging current of the temporally inactive circuit component. Through such parasitic, reverse-charging processes and reverse-charging currents of the energy storing component, a large part of the energy fed into the circuit component is lost, for example, by development of heat.

SUMMARY OF THE INVENTION

Proceeding on the basis of the above-discussed disadvantages of the state of the art, as explained using the example of conventional two-conductor field devices, an object of the invention is to provide a field-device electronics suitable for a field device, or a two-conductor field device, of the described kind, enabling the energy budget of the evaluating- and operating-circuit, especially of its circuit component, to be improved.

This object of the invention is achieved by the features, that at least one switching unit is provided in the conducting path between the electrical circuit component and the energy storing component, and that the control (open-loop or closed-loop control) unit so operates the switching unit, synchronized with clocking of the electrical circuit component, that a discharging current of the energy storing component flowing back into the circuit component is minimal.

According to an especially preferred form of embodiment of the invention, an activating input of the electrical circuit component is provided, wherein the control unit operates the activating input of the electrical circuit component with a clocking signal via an activating, control line.

A further preferred form of embodiment of the invention provides, that an energy supply of the electrical circuit component is provided, and that the control unit controls the energy supply of the electrical circuit component via a clock signal on a supply control line.

An advantageous form of embodiment of the solution of the invention is one in which the control unit operates the switching unit under clock signal control for a predetermined time interval and/or with a time offset relative to the electrical circuit component.

An efficient embodiment of the invention is one in which the control unit determines an appropriate pulse-pause ratio for the clocking signal for the switching unit and/or controls the power consumption of the electrical circuit component to a minimum value.

An advantageous form of embodiment of the apparatus of the invention apparatus is one in which at least a first measuring line is provided between the control unit and the electrical circuit component, and the control unit ascertains via at least the first measuring line the current power consumption of the electrical circuit component, and, on the basis of the current power consumption, sets the pulse-pause ratio of the clocking signal for the electrical circuit component.

According to an advantageous form of embodiment of the apparatus of the invention, a second measuring line is provided between the control unit and the energy storing component, and wherein the control unit ascertains, via the second measuring line to the energy storing component, the current value of the stored energy and, on the basis of the current energy stored in the energy storing component, sets the pulse-pause ratio of the clocking signal for the switching unit and/or for the electrical circuit component.

According to an advantageous form of embodiment of the apparatus of the invention, the control unit stores a data value last output on the output of the circuit component, and, on the basis of the difference between the last measured data value and the current data value, sets and/or appropriately adjusts the pulse-pause ratio of the clocking signal.

According to a preferred form of embodiment of the apparatus of the invention, it is provided that the switching unit is an integral component of the circuit component, and that the integrated switching unit switches the outputs, the inputs and/or the energy supply connections into a high-resistance state.

A further advantageous form of embodiment of the apparatus of the invention apparatus provides, that the switching unit is embodied as an electronic switch.

BRIEF DESCRIPTION OF THE DRAWINGS

The invention will now be explained in greater detail on the basis of the appended drawings. For simplification, identical parts in the drawings have been provided with equal reference characters. The figures of the drawing show as follows.

DETAILED DISCUSSION

Figure 1:
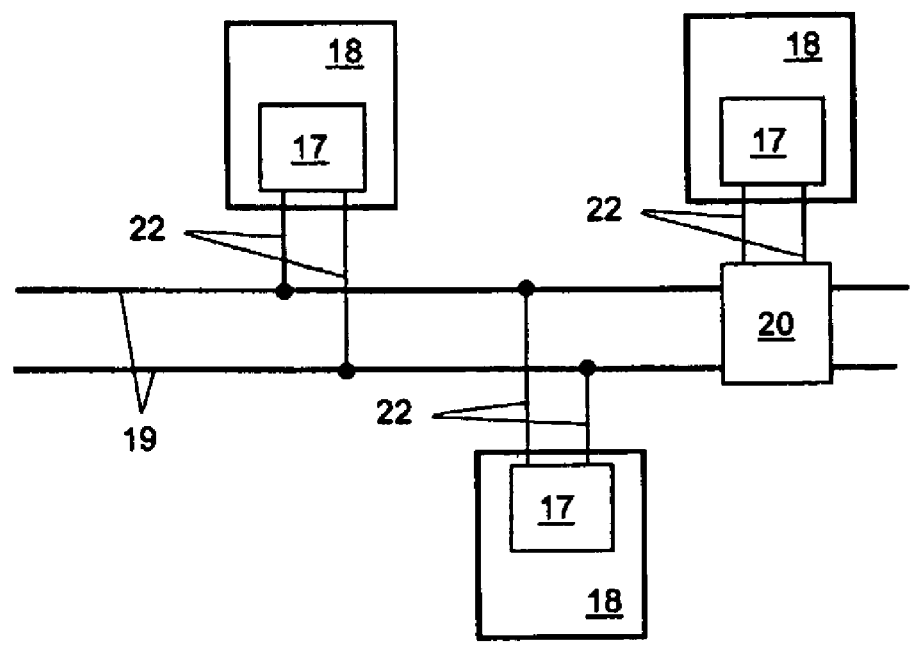
FIG. 1 a schematic, total drawing of a fieldbus with two-conductor field devices.

The block diagram of FIG. 1 shows an automation system for registering, evaluating and transmitting, process parameters and includes a fieldbus 19 and two-conductor field devices 18. Most often, the operating- and evaluating-circuits 17 of the two-conductor field devices 18 are embodied in two-conductor technology in such a manner, that they can work in conjunction with one of the usual, external fieldbusses 19. This can, on the one hand, such as disclosed in FIG. 1, be accomplished by direct connection via an electrical current loop 22 to the fieldbus system 19, e.g. according to the FIELDBUS-protocol, and, on the other hand, the cooperation can be accomplished indirectly by interposing a bus coupler 20, e.g. according to the so-called HART-protocol.

Data transmission or communication via fieldbus 19 is accomplished, for example, on the basis of the CAN-, HART-, PROFIBUS DP-, PROFIBUS FMS-, PROFIBUS PA-, or FOUNDATION FIELDBUS-standard as well as with the corresponding transmission-protocols.

Figure 2:
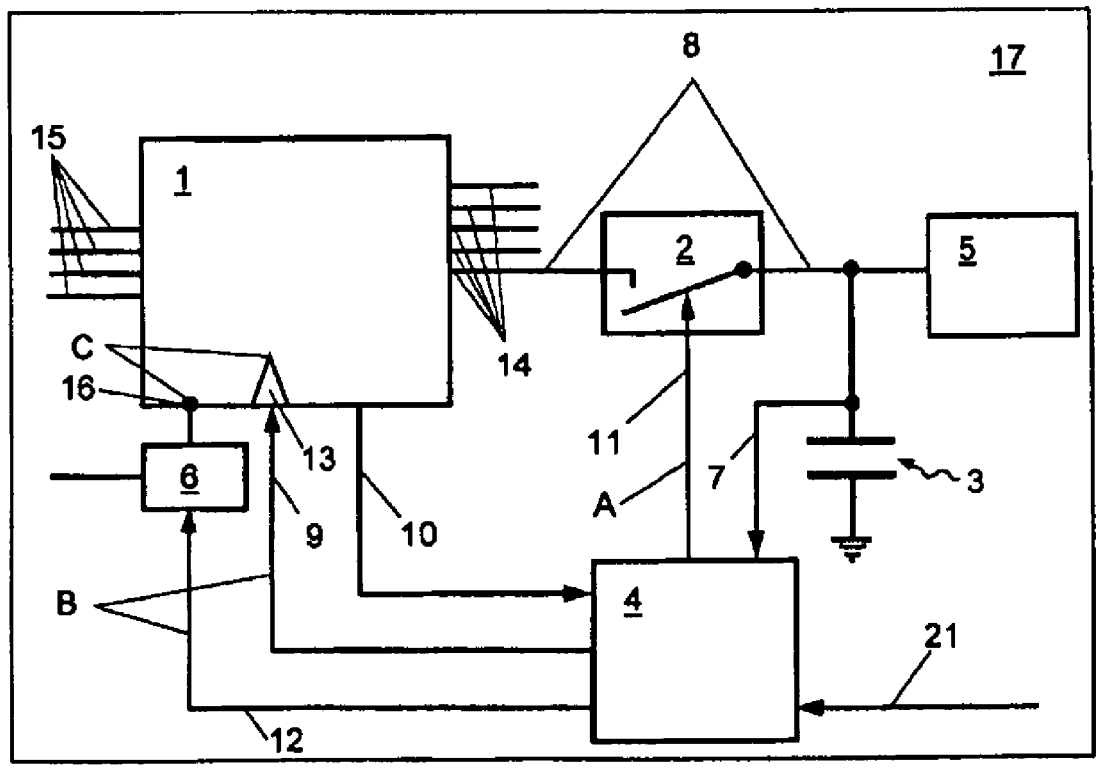
FIG. 2 a schematic drawing of an operating- and evaluating-circuit of a two-conductor field device.

FIG. 2 shows, by way of example, an embodiment of the operating- and evaluating-circuit 17 of the invention for a two-conductor field device 18. In order to keep the energy consumption of the two-conductor field device 18 under the necessary limit of the available energy, in general, circuit components 1 of the operating- and evaluating-circuit 17, which do not have to be continuously active, are maintained by a control unit 4 appropriately switched out of operation or switched into a low-energy-consuming, sleep state. Suitable switchable circuit components 1 include, in general, active semiconductor components, such as processors and logic-gates, or analog circuit components having an activating/deactivating input.

These semiconductor elements can be toggled between their active and non-active states in various ways. A large number of analog and digital semiconductor components are equipped with an activating input (enable), which includes the capability of placing the circuit component 1, or the semiconductor component, in a non-active state, wherein no, or scarcely any, energy-consuming cross-currents can flow in the circuit component 1. The activating input 13 interrupts, for example, in this connection, in a digitally operating circuit component 1, the clocking line of the system clock, or turns off, for example, in the case of an analogly working, circuit component 1, the electrical current sources setting the working points. If there is no activating input 13 present on the circuit component 1, the energy supply 6 of the circuit component 1 is switched off and on. The turning on of the energy supply 6 via a supply control line 12 or the turning on of the activating input 13 of the circuit component 1 via an activating control line 9 with a clock signal B is accomplished by the control unit 4, which, according to the available power and the power converted in the two-conductor field device 18, sets the clocking rate of the clock signal B, with which the circuit component 1 is switched on and off. The control unit 4 ascertains for this, via a measurement tapping line 21 on the electrical current loop 22, the available power transmitted from the fieldbus 19 by the measurement signal set, or received, by the two-conductor field device 18 according to a standard usual therefore, e.g. the 4-20 mA current-loop standard, a usual frequency-standard or a usual digital standard. By means of a first measuring line 10, the control unit ascertains the current power consumption of the circuit component 1 or the total operating- and evaluating-circuit 17. From knowledge of the instantaneously available power, the instantaneously needed power and the future, estimated values, the control unit 4 calculates the clocking rate and the pulse-pause ratio, with which the circuit component 1 of the operating- and evaluating-circuit 17 of the two-conductor field device 18 is placed in the active and non-active states.

However, by the clocking of the circuit component 1, there arises the problem, that energy-storing components 3, such as capacitors and coils, can discharge via the instantaneously inactive circuit component 1 to an output 14, an input 15 and/or a supply input 16. In case the energy supply 6 of the circuit component 1 is switched by a clock signal on and off and a large capacitance is provided for voltage supply support (this not being explicitly shown in FIG. 2), then this capacitance is, during a clock period, first at least partially discharged and then again charged. The energy consumption by the charging and discharging of the capacitance is linearly dependent on the capacitance value and on the clock frequency, as well as quadratically dependent on the supply voltage. When, on the other hand, the activating input 13 of the circuit component 1 turned on by the clock signal and the energy supply 6 is delivering a stable supply voltage, then the capacitance for voltage supply support is no longer discharged and again charged in a clock cycle. Then, there are no parasitic discharge currents of the capacitance for voltage supply support between the energy supply 6 and the circuit component 1.

Furthermore, there are circuit constructions, which have, connected to the output 14 or to the input 15 of a circuit component 1 in a line path 8 to a subsequent circuit 5, a capacitor as energy-storing component 3 for smoothing of the signal. In FIG. 2, a variant is disclosed, in the case of which, in the line path 8 between the output 14 of the circuit component and a subsequent circuit 5, an energy-storing component 3, e.g. a capacitor, is provided, tied to reference ground. This circuit construction occurs, for example, when the subsequent circuit 5 with the capacitor or the energy storing component 3 is constructed as a fast signal rectifier-, logarithming- or lowpass-circuit. The energy contained in the energy storing component 3 or in the capacitor can, in the case of an inactive, turned-off, circuit component 1, be partially discharged by such. In order to minimize the discharge currents between the inputs 15, the outputs 14 and the supply input 16 of the circuit component 1 and the energy storing component 3, there is integrated into the conducting path 8 a switching unit 2, which is controlled and clocked synchronously to the clocking of the circuit component 1 or its energy supply 6 by the control unit 4 via a switching unit control line 11. Through this interrupting of the conductor path 8 by the switching unit 2, the charge of the energy storing component 3 remains during the inactive phase of the circuit component 1 at least partially in place, and no parasitic discharge currents can occur via the circuit component 1. In a subsequent, active phase of the clock cycle of the circuit component 1, the charge of the energy storing component 3 is brought back to the value provided by the circuit component. Switching unit 2 forms with the energy storing component 3, in some respects, a sample-hold unit, which, for example, in the case of application of an analog-digital converter as subsequent circuit 5, is inserted, in order to hold the charge, or the analog measured value, constant.

Via the clocking rate and the duty cycle of the clocking, the saved power can be adjusted. For this, control unit 4 determines the current power consumption of the circuit component 1 and the last output data value on the output 14 of the circuit component 1 via the first measuring line 10 and the current charge state of the energy storing component via a second measuring line 7. The control unit 4 calculates, from these ascertained values, the necessary clocking rate and the necessary pulse-pause ratio for operating the switching unit 2.

It is also an option, that the control unit 4 and/or the switching unit 2 are/is directly integrated into the circuit component 1, e.g. a signal processor, so that the circuit component 1, including the outputs 14, inputs 15 and supply input 16, clocked by an internal control unit 4, shifts during an inactive phase of the circuit component 1 into a high-resistance state.

Figure 3:
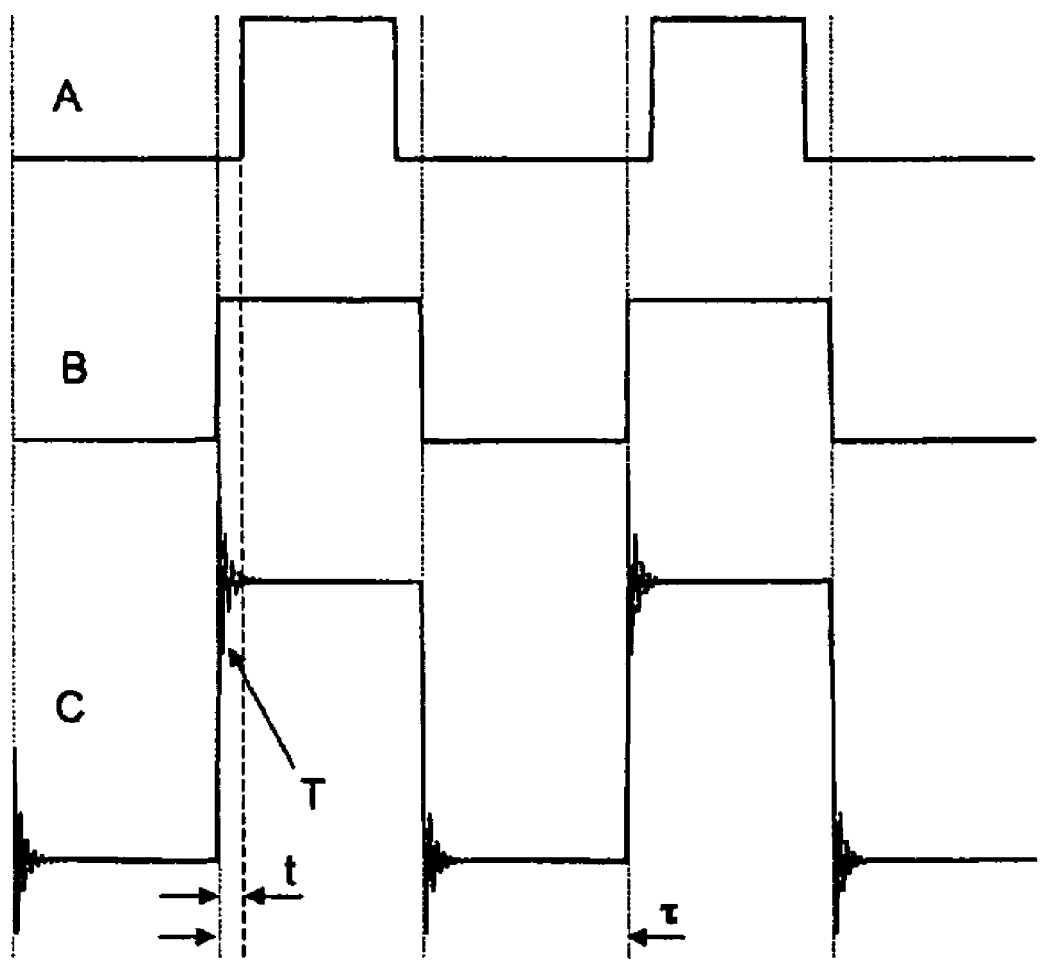
FIG. 3 a schematic timing diagram of the signals in the operating- and evaluating circuit of FIG. 2.

FIG. 3 shows a timing diagram, by way of example, for the signal currents of the switching signal A in the switching unit control line 11, the clock signal B of the activating control line 9 or supply control line 12 and the supply signal C in the circuit component 1 or in the supply input 12 of FIG. 2. Control unit 4 produces a clock signal B with the period t, which controls the circuit component 1 through the activating input 13 via the activating control line 9 or through the supply input 16 via the supply control line 12 and the energy supply 6. This clock signal B brings about, in the circuit component 1, a supply signal C, which has a transient behavior of transient decay time t in a transient zone T of the supply signal C. The switching signal A, with which the switching unit 2 is operated by the control unit 4 and, thus, with which the line path 8 is completed, is delayed, relative to the clock signal B, by the transient decay time t.

This transient behavior of the circuit component 1 occurs due to the fact that the circuit component 1 needs a certain settling time t, until steady state is reached, in which the voltage supply is applied stably and current is flowing constantly. Or, in other words, this transient behavior of the circuit component 1 occurs due to the fact that the semiconductor elements are constructed of transistors, which all have a mainly capacitive reaction between output and input. In the case of bipolar transistors, this effect is much stronger than in the case of MOS-transistors.

By way of the time shift of the clock signal B relative to the switching signal A, the signal in the transient zone T, when the circuit component 1 is not working correctly, is not forwarded to the subsequent circuit 5 and the energy-storing component 3.

The invention claimed is:

1. An apparatus for optimizing power consumption of an electrical circuit component in an operating- and evaluating-circuit of a two-conductor field device, comprising:
    a control unit, which switches the electrical circuit component in an active and an inactive phase with a clock signal;
    an energy supply unit is provided for supplying the electrical circuit component with energy;
    at least one energy-storing component is connected to at least one output, at least one input, and/or;
    a supply input of the electrical circuit component;
    wherein:
    at least one switching unit is provided in a conductor path between the electrical circuit component and said energy storing component; and
    said control unit so operates said switching unit, synchronized with clocking of the electrical circuit component, that through interrupting of the conductor path by the switching unit, the charge of the energy-storing component remains during the inactive phase of the circuit component at least partially in place, and no parasitic discharge currents can occur via the circuit component, so that a discharging current of the energy storing component flowing back into the circuit component is minimal.

2. The apparatus as claimed in claim 1, further comprising:
    an activating control line; and
    an activating input of the electrical circuit component wherein:
    said control unit operates said activating input of the electrical circuit component with a clock signal on said activating control line.

3. The apparatus as claimed in claim 1, further comprising:
a supply control line; and
an energy supply of the electrical circuit component, wherein:
said control unit operates said energy supply of the electrical circuit component with a clock signal on said supply control line.

4. The apparatus as claimed in claim 1, wherein:
said control unit turns said switching unit on with a clock signal for a predetermined time interval and/or with a time shift relative to the electrical circuit component.

5. The apparatus as claimed in claim 1, wherein:
control unit determines an appropriate pulse-pause ratio of the clocking of said switching unit and/or controls power consumption of the electrical circuit component to a minimal value.

6. The apparatus as claimed in claim 5, wherein:
said control unit stores a last output data value on said output of the circuit component, and sets and/or appropriately adjusts the pulse-pause ratio of the clocking on the basis of the difference between the last measured data value and the current data value.

7. The apparatus as claimed in claim 1, further comprising:
at least a first measurement line between said control unit and the electrical circuit component, wherein:
said control unit ascertains current power consumption of the electrical circuit component via at least said first measurement line and sets the pulse-pause ratio of the clocking of the electrical circuit component on the basis of the current power consumption.

8. The apparatus as claimed in claim 7, further comprising:
a second measurement line between said control unit and said energy storing component, wherein:
said control unit ascertains current value of stored energy via said second measurement line to said energy storing component and sets the pulse-pause ratio of the clocking of said switching unit and/or of the electrical circuit component on the basis of the current stored energy in said energy storing component.

9. The apparatus as claimed in claim 1, wherein:
said switching unit is an integral component of the circuit component; and
the integrated switching unit switches said outputs, inputs and/or energy supply connections into a high-resistance state.

10. The apparatus as claimed in claim 1, wherein:
said switching unit is embodied as an electronic switch.

\* \* \* \* \*